United States Patent
Skupas et al.

[15] 3,703,020
[45] Nov. 21, 1972

[54] ANTI-FOULING CASTER, SWIVEL-TYPE

[72] Inventors: John A. Skupas; Robert H. Godwin, both of Evansville, Ind.

[73] Assignee: Bliss & Laughlin Industries, Incorporated, Oak Brook, Ill.

[22] Filed: July 10, 1969

[21] Appl. No.: 840,742

[52] U.S. Cl.....................................16/31, 16/40
[51] Int. Cl. ...........................................B60b 33/00
[58] Field of Search............16/40, 41, 18, 31, 30, 97, 16/105, 91, 45

[56] References Cited

UNITED STATES PATENTS 3,327,347   6/1967   Thresher et al................16/40

*Primary Examiner*—Bobby R. Gay
*Assistant Examiner*—Doris L. Troutman
*Attorney*—Woodard, Weikart, Emhardt & Naughton

[57] ABSTRACT

A caster has a horn with sides widely spaced from the sides of the caster wheel except at the point of axle mounting, accomplished by reception of the axle in downwardly and forwardly inclined slots and retention therein by detent bosses.

10 Claims, 2 Drawing Figures

PATENTED NOV 21 1972

3,703,020

INVENTORS
JOHN A. SKUPAS
ROBERT H. GOODWIN
BY
Woodard, Weikart, Emhardt & Naughton
ATTORNEYS

ANTI-FOULING CASTER, SWIVEL-TYPE

Background of the Invention

1. Field of the Invention

This invention relates generally to casters, and more particularly to casters intended for use in an environment wherein they are subjected to lint, strings, threads, and other debris.

2. Description of the Prior Art

Three prior art patents to Richard W. Butsch, U.S. Pat. No. 3,204,285 issued Sept. 7, 1965, U.S. Pat. No. 3,214,786 issued Nov. 2, 1965, and U.S. Pat. No. 3,222,708 issued Dec. 14, 1965, deal with casters and scrapers therefor of a type well adapted to usage in textile mills. As described in those patents, conventional casters employed in such environments, quickly become clogged with lint and threads that inhibit proper operation. The three patents disclose and claim casters and features thereof which can be operated successfully in such environments, being comparatively immune to accumulations and malfunction from accumulations of lint and thread, and being readily serviced in the event of any such accumulation.

Although the casters in the aforementioned patents are generally mounted in a non-swivelling manner, FIG. 2 of U.S. Pat. No. 3,214,786 does show a swivel mounting. However, in that example, the axle of the caster wheel is in line with the swivel axis. It is desirable to provide a caster having the wheel axis offset from the swivel axis and, at the same time, have lint-free and easy maintenance features of the casters of those patents.

A considerable amount of prior art was cited in the aforementioned patents. The prior art includes swivel horns, seals, and detent means, but we do not consider them satisfactory for the purpose we have in mind, namely: operation in textile mills, for example. Such patents include, for example, the following:

| 9,775 | (British) | Hart | June 13, 1891 |
|---|---|---|---|
| 750,799 | | Bornemann | February 2, 1904 |
| 1,703,936 | | Jervoise | March 5, 1929 |
| 1,864,933 | | Pynynski | June 28, 1932 |
| 2,463,323 | | Sichman, Jr. | March 1, 1949 |
| 2,724,858 | | Reichert | November 29, 1955 |

Summary of the Invention

Described briefly, in a typical embodiment of the present invention, a caster is provided with a swivel and a horn with downwardly and rearwardly extending sides, having downwardly and forwardly extending axle-receiving slots at the distal ends of the sides. While the distal ends are set in close to the wheel, the sides project outwardly therefrom so that a wide clearance is provided between the horn sides and the sides of the caster wheel from the front to the rear edges of the sides. Bosses are provided adjacent the slots for retaining the axle and wheel assembly in the slots except when removal is desired.

DESCRIPTION OF THE PREFERRED EMBODIMENT

Figure 1:
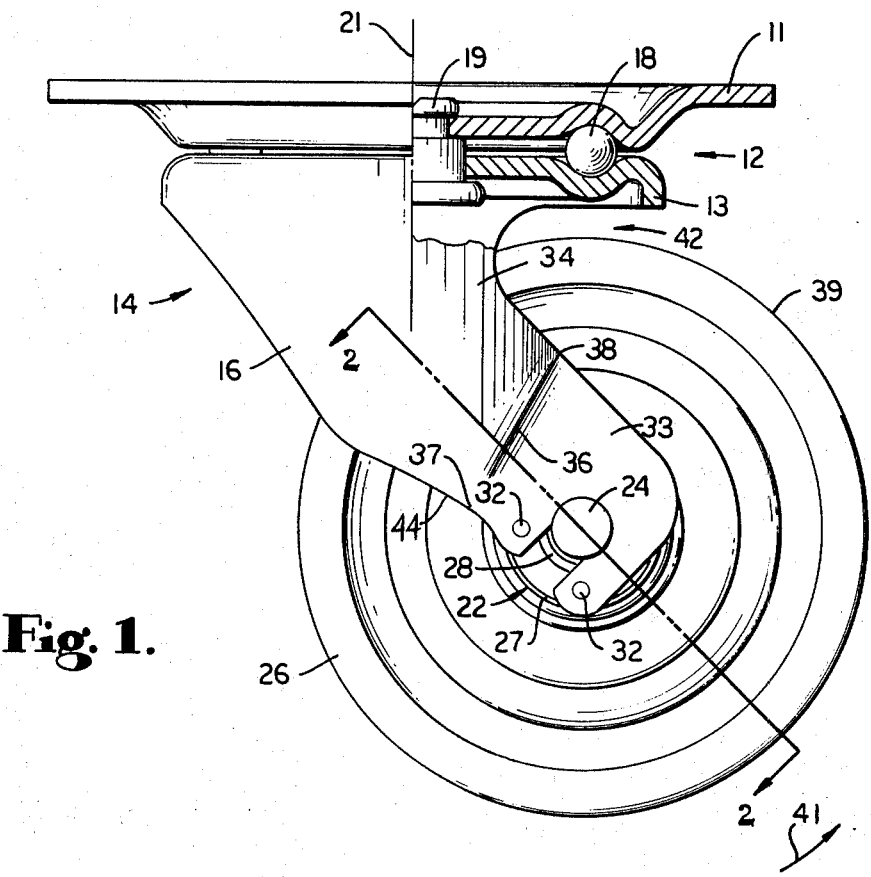
FIG. 1 is a side elevational view of a caster illustrating a typical embodiment of the present invention, a portion thereof being sectioned to show the swivel bearing mounting.

Referring now to the drawings in detail, the caster assembly has a mounting plate 11 by which it may be secured to the bottom of a cart, dolly, or the like. This plate serves as the upper race of the ball bearing assembly 12, the lower race 13 of which serves as the bridging portion of the yoke of the caster horn 14 having the two sides 16 and 17. A series of balls 18 is provided, together with the pivot connector king pin 19 to provide the vertical swivel axis 21.

The caster horn side members 16 and 17 have slots 22 and 23 therein, respectively. These receive the opposite ends of the axle 24 of the wheel and axle assembly including the wheel 26. The wheel is mounted to the axle 24 through ball bearing assemblies including outer race 27 and inner race 28 with balls (not shown) disposed therebetween. A spacer 29 disposed around the axle 24, abuttingly engages the inner race 28 and the caster horn side portion immediately around the axle. Of course it should be understood that the spacer could be eliminated and the axle could be formed with a stepped outside diameter. In the illustrated embodiment, the wheel, axle, and spacer assembly are mounted on the caster horn sides by reception of the slots or grooves 31 of the axle in the slots 22 and 23 of the caster horn sides. Thus the axle will not turn in the horn. The assembly is retained in the caster horn side slots by means of the bosses 32 engaging the spacers 29. By variation of the size of the bosses, variation can be achieved in the amount of force required to either remove or replace the wheel and axle assembly in the frame.

Figure 2:
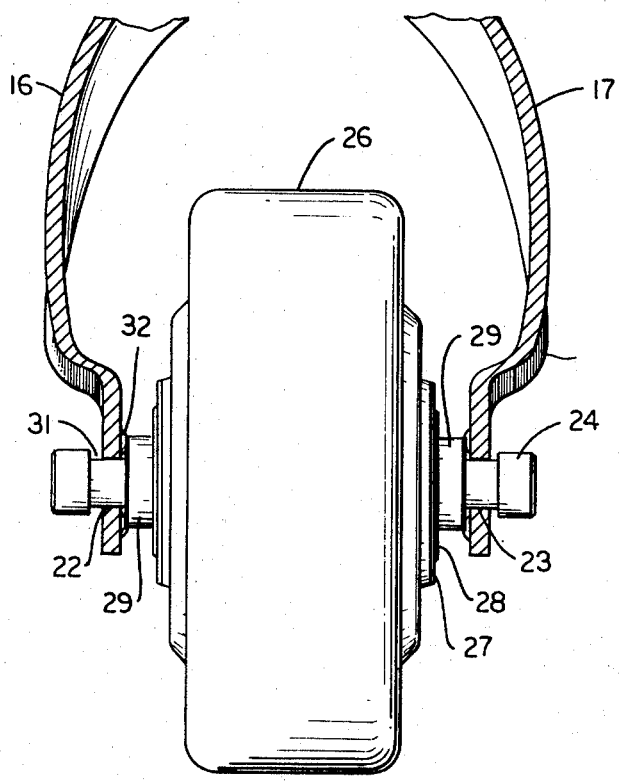
FIG. 2 is a section taken at line 2—2 in FIG. 1 and viewed in the direction of the arrows.

It is a feature of the present invention that the sides of the caster horn are formed in such a manner as to discourage accumulations and entanglement of lint and threads therewith. Referring to the caster horn side 16, for example, it projects outwardly from the portion 33 to the portion 34 beginning at a line 36. In the illustrated example, this line happens to be a straight line extending from the front marginal edge of the horn at 37 to the rear marginal edge of the horn side at 38. Note that the distance of point 38 from the axle is greater than the distance of point 37 from the axle. As a result, any lint picked up on the periphery 39 of the wheel as the wheel rolls forward, and thereupon moved around the axle in the direction of the arrow 41 and toward the horn in the direction of the arrow 42, and hanging down the sides toward the rear edge at point 38, will move into an increasingly larger lateral space once past edge 38. In other words, while the shape of the lateral area between the wheel side and the caster horn changes from the rear edge to the front edge (the part of this change from the section 2-2 line to the front edge being apparent in FIG. 2) the area is ample at all points from the rear edge to the front edge, and the largest portion is increasingly nearer to the axle as the wheel moves around to the front edge as at 44, for example. Consequently there is no tendency of tread-carried lint to become wedged between the wheel side and horn side once past the edge 43. The edge 43, being straight and comparatively sharp, would tend to trim away any lint which might be hanging over at that location.

In addition to the downwardly and forwardly inclined axle receiving slots in the downwardly and rearwardly inclined sides of the caster horn, thus tending to keep the axle in position in spite of encountering obstructions during operation, the fact that it is well behind the plane of the swivel axis 21 assures good caster action. The horn slot axle mounting facilitates easy removal of the wheel and axle assembly for servicing when and if desired, and the horn construction as described above minimizes the frequency at which such servicing may be required. The caster can have seals of the type shown at 51 in FIG. 2 of the aforementioned Butsch U.S. Pat. No. 3,204,285, if desired.

The invention claimed is:

1. A caster comprising:
   swivel means;
   a horn mounted on said swivel means and having a pair of horizontally-spaced sides extending downwardly and rearwardly and having inclined axle-receiving slots extending downwardly and forwardly therein;
   and a wheel and axle assembly, with the axle thereof received in said slots;
   and retaining means on said horn and retaining said axle in said slots.

2. The caster of claim 1 wherein:
   the sides of said horn have front and rear margins, each side projecting outwardly laterally with respect to the wheel of said wheel and axle assembly at all points along a line which extends from said front margin to said rear margin at distances from the axle less than the radius of said wheel at the periphery thereof.

3. The caster of claim 2 wherein:
   the distance of said line from said axle decreases from a maximum at said rear margin.

4. The caster of claim 3 wherein:
   the distance of said line decreases from said maximum to a minimum at said front margin near the entrance of said slot.

5. The caster of claim 1 wherein:
   said sides extend downwardly and rearwardly from said swivel means;
   said slots are located behind a plane containing the swivel axis of said swivel means and are downwardly and forwardly opening, the entrance of said slots being behind said plane.

6. The caster of claim 5 wherein:
   the slotted portions of said sides are more closely spaced than the other portions of said sides.

7. The caster of claim 6 wherein:
   all portions of said caster horn sides are laterally spaced farther from the wheel of said assembly at the periphery of said wheel, than the lateral spacing of said slotted portions of said caster horn sides from said wheel.

8. The caster of claim 1 wherein:
   said caster horn sides face those portions of the sides of the wheel of said wheel and axle assembly which are in horizontal projection therewith, the wheel-facing portions of said horn sides flaring laterally away from the central portion of said wheel immediately adjacent said slots throughout the angle of the sector of said wheel faced by said wheel-facing portions.

9. The caster of claim 8 wherein:
   each of said caster horn sides has front and rear margins, the lateral space between said wheel and said wheel-facing horn side portions increasing from a minimum near said axle at said front margin.

10. A caster comprising:
    mounting means;
    a horn mounted on said mounting means and having a pair of horizontally spaced sides, with axle receiving means thereon;
    a wheel and axle assembly with axle thereof mounted to said receiving means;
    the portions of said caster horn sides facing the sides of the wheel flaring laterally away from the central portion of said wheel adjacent said axle to prevent entanglement, with said horn sides, of foreign matter picked up on said wheel, all portions of said sides other than portions immediately adjacent said axle being substantially further spaced from said wheel than are said axle receiving means.

* * * * *